United States Patent
Schick et al.

(10) Patent No.: US 8,359,243 B2
(45) Date of Patent: Jan. 22, 2013

(54) SYSTEM AND METHOD FOR ELECTRONICALLY SCHEDULING A VEHICLE ORDER

(75) Inventors: Matthew Schick, Dearborn, MI (US); Mark Schunder, Dearborn, MI (US)

(73) Assignee: Ford Motor Company, Dearborn, MI (US)

(*) Notice: Subject to any disclaimer, the term of this patent is extended or adjusted under 35 U.S.C. 154(b) by 715 days.

(21) Appl. No.: 12/464,204

(22) Filed: May 12, 2009

(65) Prior Publication Data
US 2010/0293022 A1  Nov. 18, 2010

(51) Int. Cl.
*G06Q 30/00* (2012.01)
(52) U.S. Cl. .................................. 705/26.5
(58) Field of Classification Search ............. 705/26.5
See application file for complete search history.

(56) References Cited

U.S. PATENT DOCUMENTS

| | | | |
|---|---|---|---|
| 2002/0099587 A1* | 7/2002 | Kakihana et al. ............... 705/7 |
| 2002/0178080 A1* | 11/2002 | Ly et al. ............... 705/26 |
| 2005/0246686 A1* | 11/2005 | Seshadri et al. ............... 717/117 |
| 2008/0229280 A1* | 9/2008 | Stienhans ............... 717/107 |
| 2009/0070512 A1* | 3/2009 | Narad ............... 710/301 |
| 2009/0119345 A1* | 5/2009 | Davydok et al. ............... 707/201 |
| 2010/0145492 A1* | 6/2010 | Russell ............... 700/103 |

OTHER PUBLICATIONS

Chen, Songlin, Mechanism Design for Procuring Customized Products, Hong Kong University of Science and Technology, Jul. 2008.*
Applicants' Statement of Relevance In Accordance with 37 C.F.R. 1.98(a)(3)(i) for Non-Patent Literature Reference "Ford Order Fulfillment".
Ford Order Fulfillment Sep. 2008.

* cited by examiner

*Primary Examiner* — Nathan Erb
(74) *Attorney, Agent, or Firm* — Damian Porcari; Brooks Kushman P.C.

(57) ABSTRACT

A method and system for scheduling an electronic vehicle order. The method includes receiving an electronic vehicle order, which has a plurality of associated vehicle-option inputs, from a customer; expanding the order by associating each vehicle option with a plurality of part codes to generate a subset of part codes; applying a first set of rules that has non-deterministic criteria to the subset of part codes for conflict determination; resolving any conflict(s) between part codes by applying a second rule set, which has deterministic criteria; and scheduling a vehicle build order based at least in part on the part code subset.

14 Claims, 5 Drawing Sheets

SYSTEM AND METHOD FOR ELECTRONICALLY SCHEDULING A VEHICLE ORDER

BACKGROUND

1. Technical Field

Embodiments of the present invention relate to a technique for electronically scheduling a vehicle order.

2. Background Art

Certain types of vehicle order processing systems may rely on rules to dictate the build criteria for a given vehicle or vehicle line. Such rules may be tightly coupled and distributed over several disparate databases.

A problem with such vehicle ordering systems lies in the complexity of scalability due to the tight rule-set coupling. Furthermore, rules in these systems may be authored independently of other rules. Authoring errors and differences between databases, among other factors, can cause the rules to behave non-deterministically, resulting in systemic performance issues.

Therefore, what is desired is a rule-driven vehicle-ordering system that works efficiently in a multiple database environment.

SUMMARY

Several embodiments of the present invention take the form of a method for electronically scheduling a vehicle order. The method includes receiving an electronic vehicle order from a customer. The order has a plurality of associated vehicle option inputs. The method includes expanding the vehicle order by associating each vehicle option input with a plurality of part codes from a database. The method includes applying a first set of rules to the part codes in a predetermined order to determine whether any conflicts exist between the part codes. The first set of rules may have non-deterministic criteria associated therewith. The method includes resolving conflicts between part codes, if one or more conflicts exists, by applying a second set of rules having deterministic criteria associated therewith. The method includes scheduling a vehicle order, if no conflicts exist, based at least in part on the part codes.

Several embodiments take the form of a vehicle ordering system. The ordering system includes a database system having one or more databases. The database system has a first set of rules distributed among one or more of the databases. The vehicle ordering system includes an administrative interface in electrical communication with the database system. The vehicle ordering system also includes an ordering interface in communication with the database system and the administrative interface via a network. The ordering system has a computer-readable medium having a set of encoded computer-readable instructions. The set of instructions includes instructions for carrying out the method described above.

Several embodiments take the form of a computer readable medium. The computer readable medium has a set of encoded instructions for carrying out the method described above.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

Reference will now be made in detail to the presently preferred embodiments of the present invention, which constitute the best modes of practicing the invention presently known to the inventors. The Figures are not necessarily to scale. However, it is to be understood that the disclosed embodiments are merely exemplary of the invention, which may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It must also be noted that, as used in the specification and the appended claims, the singular form "a," "an," and "the" comprise plural referents unless the context clearly indicates otherwise. For example, reference to a component in the singular may be intended to comprise a plurality of components.

Figure 1:
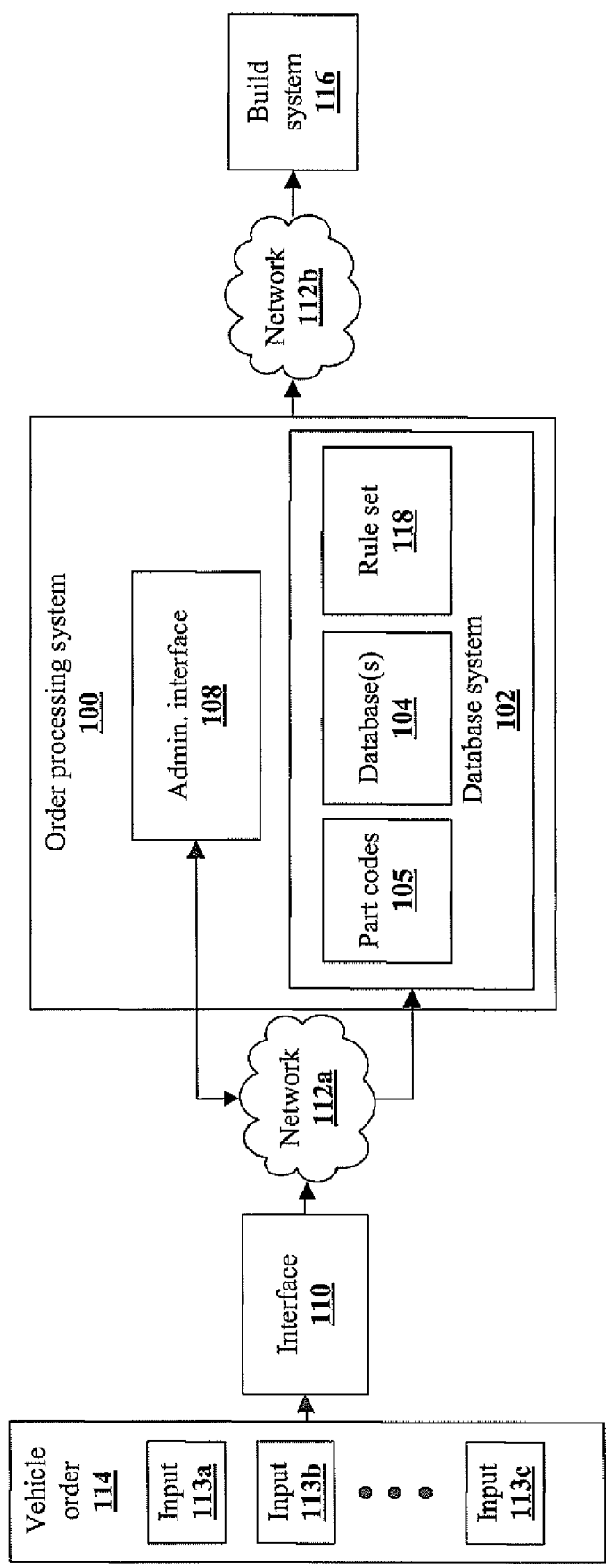
FIG. 1 shows a schematic illustration depicting a vehicle ordering system according to an embodiment of the present invention.

FIG. 1 illustrates a simplified schematic view of a vehicle ordering system 100 according to embodiments of the present invention. The ordering system 100 includes a database system 102 having one or more associated databases 104. Any suitable number of databases may be used, and each database 104 can be of any suitable type. For example, the database(s) 104 may be hierarchical databases, relational databases, fuzzy logic-based databases, or the like.

The database system 102 has an associated set of rules 118 distributed among one or more of the databases 104. The following disclosure serves to clarify the function of the rules 118. In an embodiment, the rules are binary encoded to a computer readable medium. However, the rules 118 may be stored in other suitable encoded formats, for example, static textural strings and/or binary logical structures. It will be apparent from the following disclosure that the order processing system 100 is well-suited to environment in which the rules 118 are manually input or comprise multiple disparate databases.

As shown, the order processing system 100 includes an administrative interface 108 in electrical communication with the database system 102 and in electrical communication with an ordering interface 110 via a network 112a. The ordering interface 110 can receive an electronic vehicle order 114 from a customer and transmit the order 114 to the ordering processing system 100 via the network 112a. For example, a customer may place an electronic order at a vehicle dealership via the ordering interface 110 which, in a preferred embodiment, is a computer terminal located at the vehicle dealership. Administrative interface 108 may be a computer terminal located at a central administrative facility tasked with coordinating and processing orders received from multiple vehicle dealerships.

As shown, the database system 102 includes a plurality of part codes 105, which may be stored to a single database 104 or distributed over a plurality of databases 104. The following disclosure serves to clarify the function of the part codes 105.

The order processing system 100 is configured to electrically communicate with a vehicle build system 116 via a network 112b. The networks 112a, 112b, although shown separately, may compose a single network. The networks 112a, 112b may be wide area networks (WAN), such as the internet, or local area networks (LAN). In a preferred embodiment, the network 112a is a WAN, and the network 112 is a LAN. However, other embodiments may contemplate other suitable network configurations.

Figure 2:
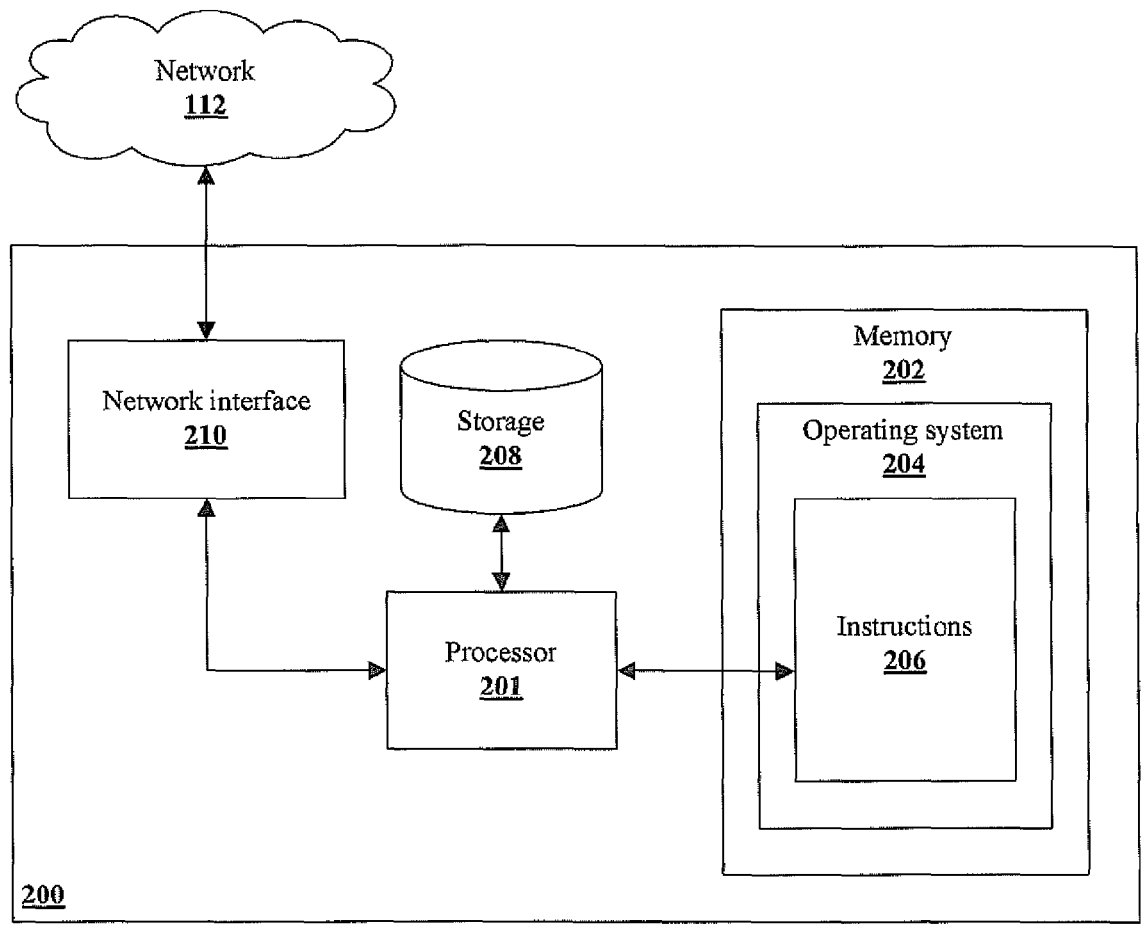
FIG. 2 shows a schematic illustration depicting an environment in which embodiments of the present invention may operate.

FIG. 2 illustrates a simplified, schematic view of a computer readable medium 200 of the order processing system 100 according to embodiments of the present invention. As illustrated, the computer-readable medium 200 includes a processor 201 that is operative to execute programmed instructions from an instruction memory 202. The instructions executed in performing the functions herein described may include instructions stored within program code considered part of an operating system 204, instructions stored within program code considered part of an application, or instructions stored within program code allocated between the operating system 204 and the application 206. The memory 202 can include random access memory (RAM), read-only memory (ROM), or a combination of RAM and ROM. As shown, the computer-readable medium 200 includes a network interface 210 for coupling the computer-readable medium 200 to a network 203. The network 203 corresponds to one or more of the networks 112a, 112b shown in FIG. 1. The computer-readable medium 200 may optionally include one or more secondary storage devices 208, such as a disk drive, a tape drive, or the like.

Referring to FIGS. 1 and 2, the order processing system 100 includes at least one computer-readable medium, for example, the computer-readable medium 200 shown in FIG. 2. A number of computer readable medium configurations are realizable to execute the functions described herein. For example, each database 104 in the order processing system 100 may be stored to a separate computer readable medium 200, multiple databases 104 may be stored to a single medium 200, or the like.

Figure 3:
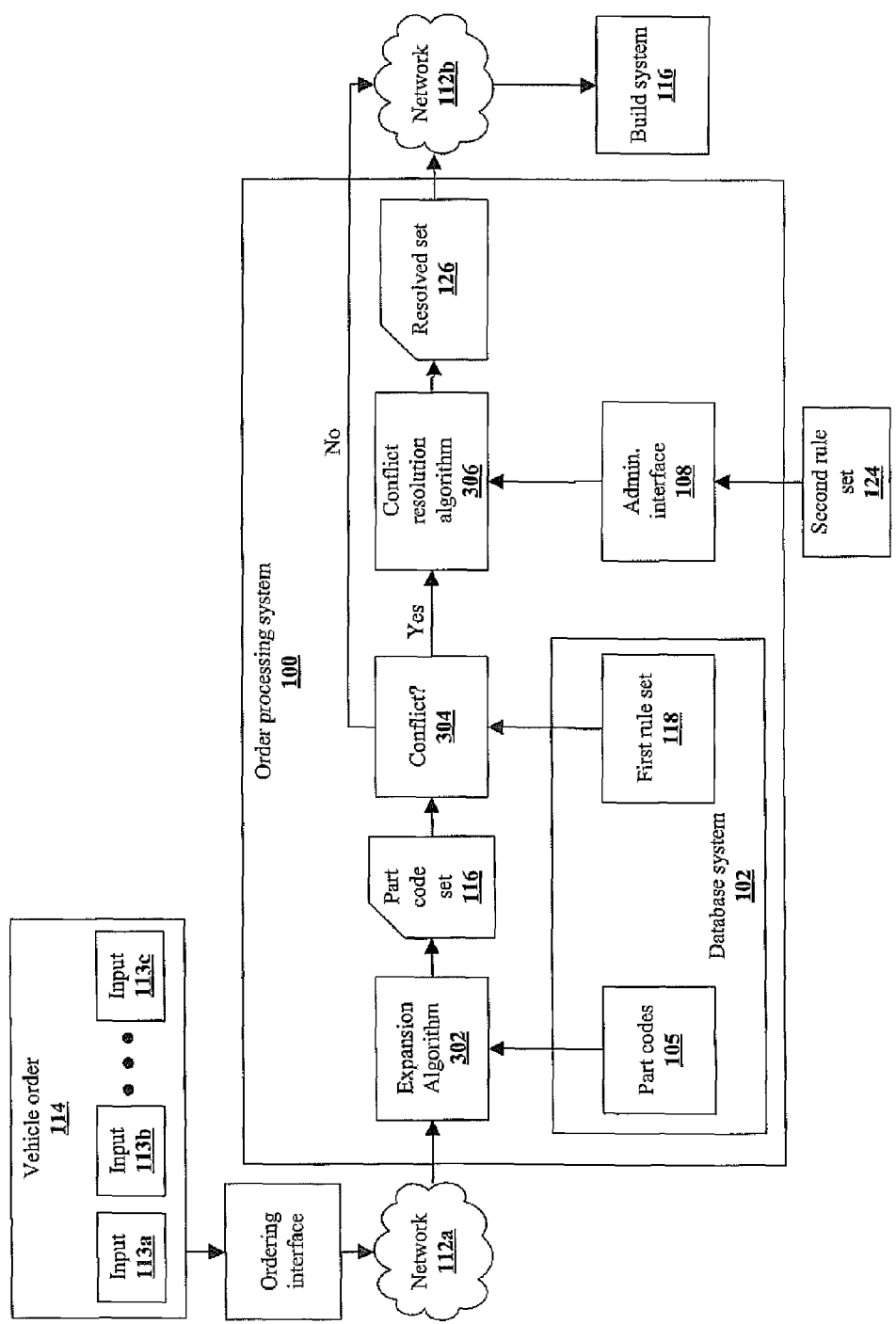
FIG. 3 shows a schematic illustration depicting an aspect of the vehicle ordering system shown in FIG. 1.

FIG. 3 shows a schematic illustration depicting an aspect of the order processing system 100, shown in FIG. 1, to illustrate a technique for electronically scheduling a vehicle order. As noted, the electronic vehicle order 114 may be received at the order processing system 100 via the ordering interface 110 and the network 112a. As shown, the vehicle order 114 has a plurality of associated vehicle option inputs 113a-113c. Each option input 113a-113c may, for example, include information corresponding to a respective vehicle option selected by a customer.

As shown, the electronic vehicle order 114, along with a plurality of part codes 105, are received as inputs to an expansion algorithm 302. The expansion algorithm 302 expands the vehicle order 114 by associating each vehicle option input 113a-113c with the plurality of part codes 105 from the database system 102 to generate a subset of part codes 116. In an embodiment, each input 113a-113c is expanded into a family of associated part codes via a forward expansion algorithm. The part code subset 116 includes each part code family. In an embodiment, the vehicle option inputs 113 are high-level vehicle options selected by a customer, and the part codes 105 include low-level codes associated with the respective option input 113.

Element 304 depicts a decision element. Here, a first set of rules 118 is applied to the part code subset 116 to determine whether any conflicts exist between the various part codes in the subset 116. As referred to in this disclosure, a "conflict" between part codes includes, but is not limited to, an event in which two or more part codes erroneously occur together as dictated by the rules 118. A "conflict" may also be an event in which a decision may be required in order to select one of two-or-more part codes.

In an embodiment, the first rule set 118 is applied to the decision element 304 in a predetermined order. The rule set 118 may have non-deterministic criteria associated therewith. More specifically, the rules 118 may include information associated with manual-input formatting errors, logical errors, and/or the like. In an embodiment, a rule reordering strategy is used to eliminate forward references in the first rule set 118.

As mentioned, the decision element 304 decides whether or not conflicts exist between part codes in the subset 116. If one or more conflicts exists, the conflicts are resolved by applying a second set of rules 124 via a conflict resolution algorithm 306. As shown, the second rule set 124 may be applied via the administrative interface 108. In an embodiment, the second rule set 124 enables an authorized user to provide conflict resolution. For example, an authorized user may provide a set of decisions to resolve non-deterministic conflicts in the part-code subset 116. In another embodiment, the rule set 124 may be applied via an administrative system (not shown). A skilled artisan will recognize a variety of systems that may be used to resolve non-deterministic conflicts, for example a decision database for conflict resolution.

Figure 4A:
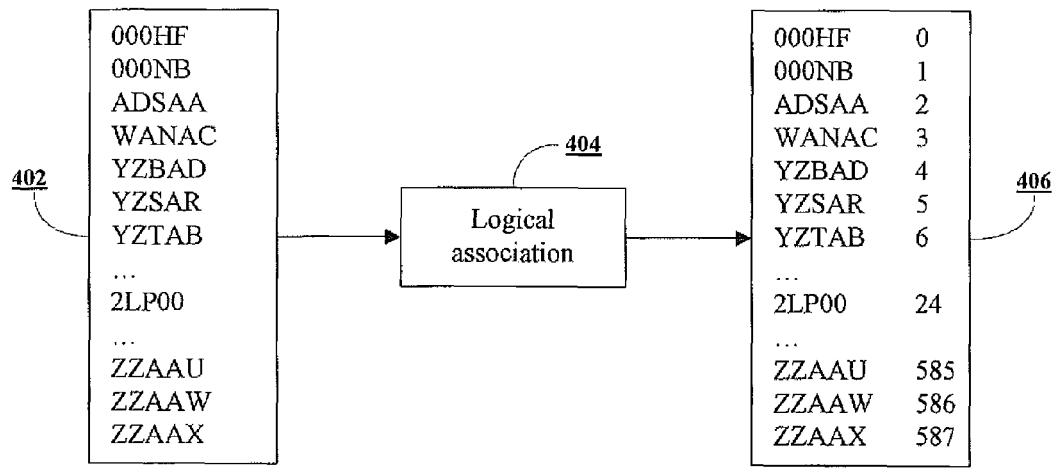
FIGS. 4A-4B each show a schematic illustration depicting a technique for associating rules and part codes with logical data structures according to an embodiment of the present invention.
Figure 4B:
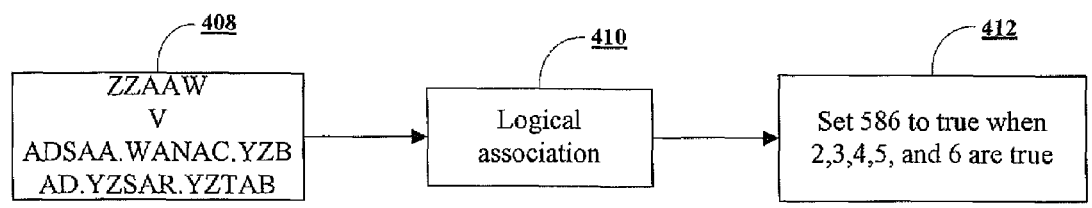

FIGS. 4A and 4B each illustrate an aspect of the ordering processing system according to embodiments of the present invention. As described, the expansion algorithm 302 generates a part code subset 116 from a given electronic order 114 and a given part code set 105. In the part code subset 116, eleven part codes 116a are shown. Also, each part code in the subset 116 is shown to be encoded in a static textural form. A logical association is performed on the part code subset 116 such that each part code associates with a numeric identifier.

In FIG. 4B, a rule 408 is shown in static textural form. The rule enables part code "ZZAAW" when each of part codes "ADSAA", "WANAC", "YZBAD", "YZSAR", and "ZTAB" are enabled. At a logical association phase, depicted by element 410, a logical association is performed such that each part code in the rule 408 is replaced with its numeric counterpart. The element 406 in FIG. 4A shows a listing of part codes and the corresponding numeric counterparts. The static textural codes 116 and the rules 408 may be logically associated in a variety of ways. In one embodiment, the rules and the part codes may be respectively encoded into bit vectors. In this manner, binary comparisons can be made between vectors rather than static string comparisons. A skilled artisan will recognize a variety of other data structures that may be used for this purpose, including hash tables, dynamic arrays, and/or the like.

Figure 5:
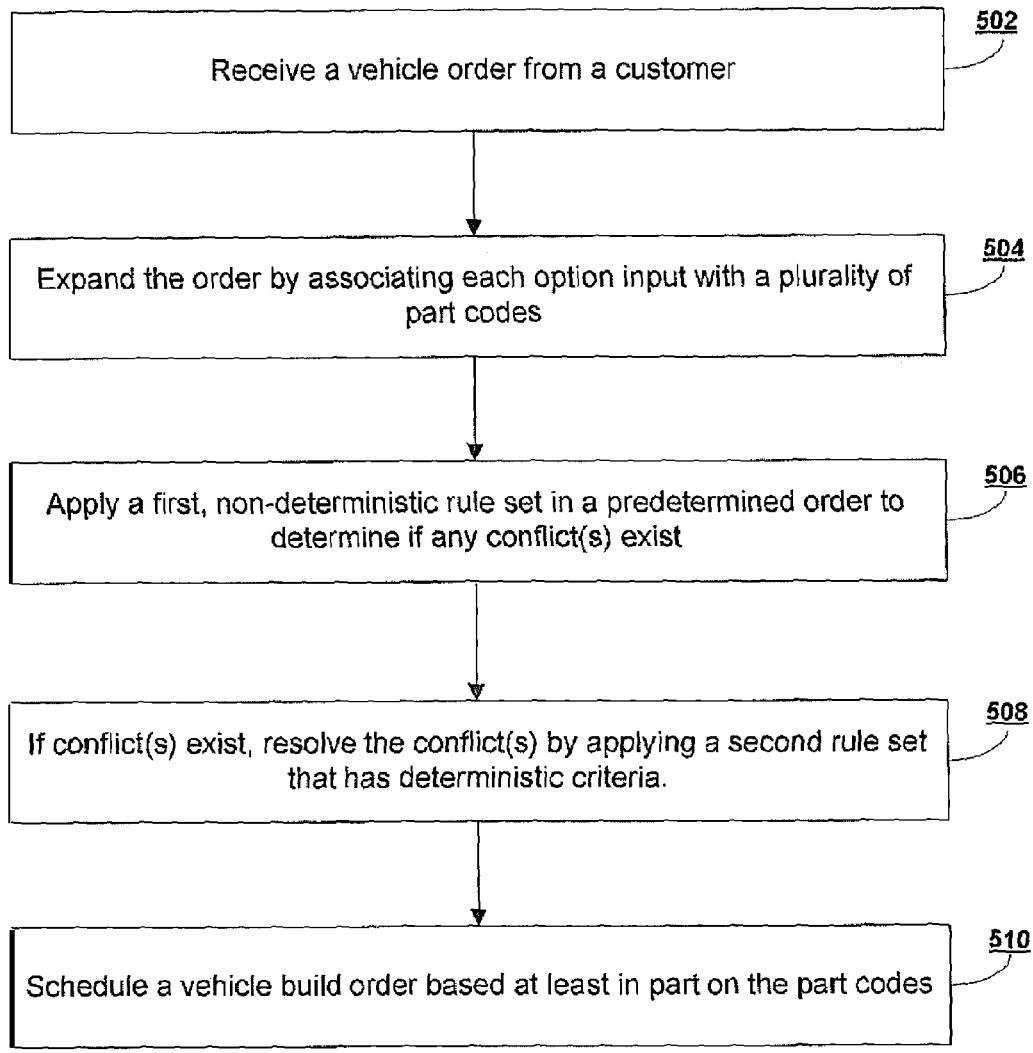
FIG. 5 shows a flowchart illustrating a method according to an embodiment of the present invention.

FIG. 5 shows a flow diagram illustrating an order processing technique according to an embodiment of the present invention. In step 502, a customer order is received by the order processing system. The order has several vehicle option inputs selected by the customer. In step 504, the order is expanded by associating each vehicle option input with a plurality of part codes from a database. It should be understood that part codes not selected by the customer may also be included. For example, certain vehicles or vehicle families may have "fixed" features, or part codes, that may be included in the expansion process.

In step 506, a first set of rules in applied to the part codes in a predetermined order to determine whether any conflicts exist between the part codes. The first set of rules has non-deterministic criteria associated therewith.

In step 508, if conflicts exist between any of the part codes, a second set of rules, which has deterministic criteria associated therewith, is applied to resolve any conflicts. A vehicle order based at least in part on the resolved part code subset may then be scheduled.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed:

1. A method for scheduling a vehicle order comprising:
    receiving at a computer processor an electronic order having a plurality of option inputs; and
    performing, by the computer processor, all of the following steps:
        expand the order by associating each option input with a plurality of part codes from a database;
        apply a first rule set comprising non-deterministic criteria to the part codes to determine that one or more conflicts exist between the part codes, the first rule set applied according to a rule reordering strategy to eliminate forward references in the first set of rules;
        resolve the one or more conflicts by applying a second rule set comprising deterministic criteria; and
        output a vehicle build order based at least in part on the part codes.

2. The method of claim 1 wherein the step of expanding the vehicle order is according to a forward expansion.

3. The method of claim 1 wherein the rules in the first set are static textural rules, and the step of expanding the vehicle order further comprises associating each static textural rule with a corresponding logical data structure.

4. The method of claim 3 wherein each part code is represented by a logical data structure, and the step of applying a first set of rules includes performing binary comparisons between one or more of the logical binary rules and a plurality of the part codes.

5. The method of claim 1 wherein the second set of rules is provided via an administrative system.

6. The method of claim 1 wherein the second set of rules is provided via an authorized user.

7. The method of claim 1 wherein at least one of the conflicts includes the first set of rules generating a plurality of conflicting part codes, and rules in the second set resolve the at least one conflict by selecting one of the conflicting part codes.

8. A vehicle ordering system comprising:
    a database system including one or more databases, the database system having a first set of rules distributed among one or more of the databases;
    an administrative interface in electrical communication with the database system;
    an ordering interface in communication with the database system and the administrative interface via a network; and
    a computer processor operative to execute a set of computer readable instructions for:
        receiving an electronic vehicle order transmitted via the ordering interface, the order having a plurality of associated vehicle option inputs;
        expanding the vehicle order by associating each vehicle option input with a plurality of part codes from the database system;
        applying the first set of rules to the part codes to determine that one or more conflicts exist between the part codes, the first set of rules having non-deterministic criteria associated therewith and being applied according to a rule reordering strategy to eliminate forward references in the first set of rules;
        resolving the one or more conflicts between part codes by applying a second set of rules received via the administrative interface, the second of rules having deterministic criteria associated therewith; and
        scheduling a vehicle build order based at least in part on the part codes.

9. The system of claim 8 wherein the instruction for expanding the vehicle order is according to a forward expansion.

10. The system of claim 8 wherein the rules in the first set are static textural rules, and the instruction for expanding the vehicle order further comprises associating each static textural rule with a corresponding logical data structure.

11. The system of claim 10 wherein each part code is represented by a logical data structure, and the step of applying a first set of rules includes performing binary comparisons between one or more of the logical binary rules and a plurality of the part codes.

12. The system of claim 8 wherein the second set of rules is provided via an administrative system in electrical communication with the administrative interface.

13. The system of claim 8 wherein the second set of rules is provided by an authorized user via the administrative interface.

14. The system of claim 8 wherein at least one of the conflicts includes the first set of rules generating a plurality of conflicting part codes, and rules in the second set resolve the at least one conflict by selecting one of the conflicting part codes.

\* \* \* \* \*